United States Patent
Park et al.

(10) Patent No.: US 9,772,241 B2
(45) Date of Patent: Sep. 26, 2017

(54) APPARATUS FOR TESTING BRAKE DISK OF AIRCRAFT

(71) Applicant: DACC CARBON, Jeonju-si (KR)

(72) Inventors: Jong Hyun Park, Jeonju (KR); Chae Wook Cho, Daejeon (KR); Min Cheol Cho, Daegu (KR); Kap Su Jung, Jeonju (KR); Gi Bum Ryu, Gunsan-si (KR)

(73) Assignee: DACC CARBON, Jeonju-Si (KR)

( * ) Notice: Subject to any disclaimer, the term of this patent is extended or adjusted under 35 U.S.C. 154(b) by 304 days.

(21) Appl. No.: 14/580,696

(22) Filed: Dec. 23, 2014

(65) Prior Publication Data
US 2015/0241290 A1 Aug. 27, 2015

(30) Foreign Application Priority Data
Feb. 26, 2014 (KR) .................. 10-2014-0022858

(51) Int. Cl.
*G01L 5/28* (2006.01)
(52) U.S. Cl.
CPC .................. *G01L 5/286* (2013.01)
(58) Field of Classification Search
CPC . G01L 5/286; G01L 5/28; G01L 5/282; G01L 5/284; G01L 5/288
See application file for complete search history.

(56) References Cited

U.S. PATENT DOCUMENTS

| | | | | | |
|---|---|---|---|---|---|
| 4,856,324 | A | * | 8/1989 | Potts | G01M 17/022 73/146 |
| 5,167,148 | A | * | 12/1992 | Black | G01L 5/28 73/121 |
| 5,452,605 | A | * | 9/1995 | Wilson | G01L 3/22 73/116.06 |
| 5,945,598 | A | * | 8/1999 | Enright | G01L 5/282 73/123 |
| 7,591,167 | B2 | * | 9/2009 | Potts | G01N 19/02 73/9 |
| 7,900,751 | B2 | | 3/2011 | Walker et al. | |
| 7,908,916 | B2 | * | 3/2011 | Jenniges | G01M 17/022 73/146 |
| 8,196,462 | B2 | * | 6/2012 | Stalnaker | G01M 17/02 73/146 |

FOREIGN PATENT DOCUMENTS

KR 100184791 12/1998

* cited by examiner

*Primary Examiner* — Paul West
*Assistant Examiner* — Xin Zhong
(74) *Attorney, Agent, or Firm* — Hauptman Ham, LLP

(57) ABSTRACT

An apparatus for testing an aircraft brake disc includes: a base member having a shaft mount unit; a main shaft rotatably mounted on the shaft mount unit of the base member; a wheel assembly couple to the main shaft; a first wheel mount assembly that is disposed at a side from the base member to move in the radial direction of the wheel assembly; a first driving unit moving the first wheel mount assembly; a second wheel mount assembly that is disposed at the other side from the base member to move in the radial direction of the wheel assembly; a second driving unit moving the second wheel mount assembly; a motor assembly connected to a side of the main shaft and rotating the wheel assembly; and a first flywheel assembly separably coupled to the other side of the main shaft.

12 Claims, 3 Drawing Sheets

US 9,772,241 B2

APPARATUS FOR TESTING BRAKE DISK OF AIRCRAFT

CROSS-REFERENCE TO RELATED APPLICATIONS

This application claims the priority of Korean Patent Application No. 10-2014-0022858 filed on Feb. 26, 2014, in the Korean Intellectual Property Office, the disclosure of which is incorporated herein by reference.

BACKGROUND OF THE INVENTION

Field of the Invention

The present invention relates to apparatus for testing an aircraft brake disc.

Description of the Related Art

In general, when aircrafts are landing, wheels come out under the body, land and rotate on a runway, and are then stopped by braking force generated by brake assemblies in the wheels. An example of aircraft brake disc assemblies has been disclosed in U.S. Pat. No. 7,900,751 B2 (registered on Mar. 8, 2011).

An aircraft brake disc is composed of a pressure disc, a rear disc, and rotary discs and fixing discs that are alternately disposed between the pressure disc and the rear disc. The rotary disc is coupled to a drive key of a wheel frame of an aircraft and rotates with the wheel frame. The fixing disc is coupled to the splines of a torque tube included in an aircraft brake system, so it does not rotate with the wheel frame of an aircraft.

According to an aircraft brake disc assembly, when it is operated, a hydraulic piston pushes the pressure disc by hydraulic pressure. As the hydraulic piston pushes the pressure disc, the rotary disc and the fixing disc are pressed to each other between the pressure disc and the rear disc that is fixed. The rotary discs decelerated and stopped by friction between the rotary disc and the fixing disc. The wheel frame and the wheel of the aircraft that are rotated with the rotary disc are also decelerated and stopped.

The pressure disc, the rear disc, the rotary disc, and the fixing disc increase in temperature over 1000° C. due to friction therebetween, when an aircraft is landing. The pressure disc, the end disc, the rotary disc, and the fixing disc are made of a carbon-carbon composite to maintain friction or mechanical strength against the high temperature. The carbon-carbon composite is a material that keeps friction or mechanical strength even at a high temperature over 2500° C. and has excellent resistance against thermal shock and excellent thermal conductivity.

The braking performance of aircraft brake discs are tested, after they are manufactured.

A "tester for characteristic evaluation of brake friction material for aircraft" has been disclosed in Korean Patent No. 10-0184791 (Registered on Dec. 21, 1998) (hereinafter, referred to as a prior art). However, according to the prior art, only a brake disc assembly except a tire is tested, so similar conditions when an aircraft is landing is not implemented and an exact test cannot be achieved. Further, the apparatus is not suitable for testing aircraft wheels having various sizes.

SUMMARY OF THE INVENTION

An aspect of the present provides an apparatus for testing an aircraft brake disc that tests a brake disc of an aircraft under similar conditions to those when an aircraft equipped with the aircraft brake disc is landing.

Another aspect of the present invention provides an apparatus for testing an aircraft brake disc that rapidly tests various types of aircraft brake discs.

According to an aspect of the present invention, there is provided an apparatus for testing an aircraft brake disc that includes: a base member having a shaft mount unit; a main shaft rotatably mounted on the shaft mount unit of the base member; a wheel assembly coupled to the main shaft; a first wheel mount assembly that is disposed at a side from the base member to move in the radial direction of the wheel assembly and on which a wheel to be tested is separably mounted; a first driving unit moving the first wheel mount assembly; a second wheel mount assembly that is disposed at the other side from the base member to move in the radial direction of the wheel assembly and on which a wheel to be tested is separably mounted; a second driving unit moving the second wheel mount assembly; a motor assembly connected to a side of the main shaft and rotating the wheel assembly; and a first flywheel assembly separably coupled to the other side of the main shaft.

The first flywheel assembly and the main shaft may be coupled to or separated from each other by a flywheel connector.

The second flywheel assembly may be coupled to or separated from the first flywheel assembly.

The apparatus may further include: a first blowing unit dissipating heat that is generated when a wheel to be tested comes in contact with a side of the wheel assembly; and a second blowing unit dissipating heat that is generated when a wheel to be tested comes in contact with the other side of the wheel assembly.

The shaft mount unit may include two support frames disposed at a predetermined distance from each other on the base member, with the wheel assembly therebetween, and bearing assemblies disposed on the support frames and supporting the main shaft.

The motor assembly may include a first motor connected to the main shaft and generating torque for the main shaft and a second motor connected to the first motor and generating torque for the main shaft.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, an apparatus for testing an aircraft brake disc according to an embodiment of the present invention will be described with reference to the accompanying drawings.

Figure 1:
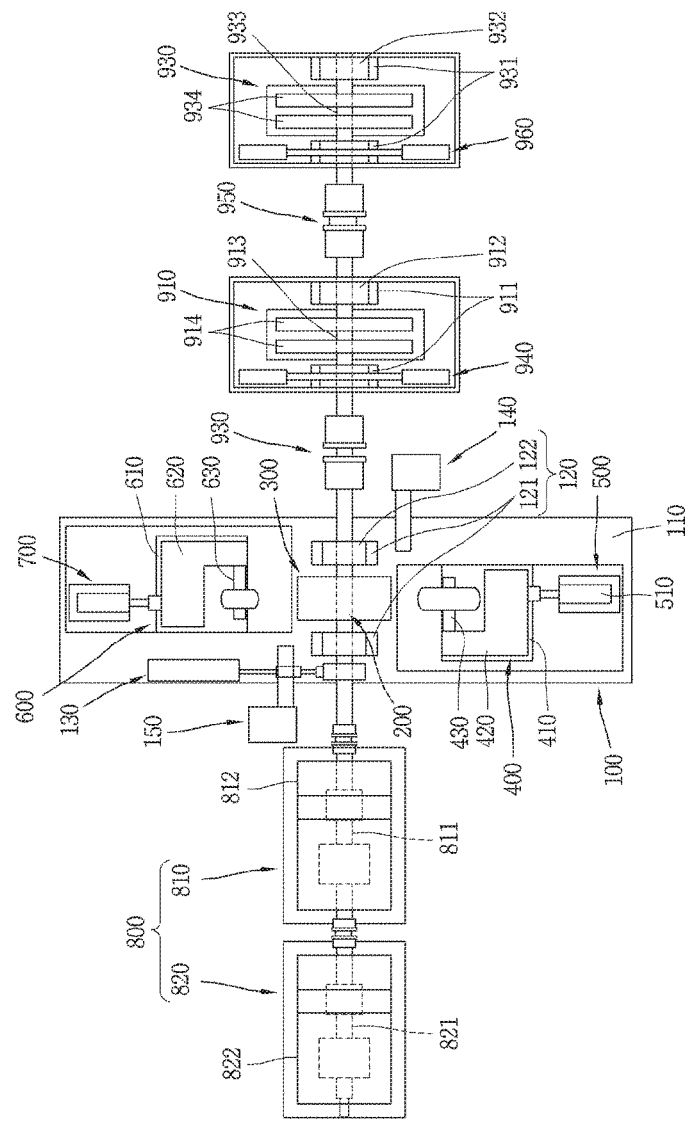
FIG. 1 is a plan view illustrating an apparatus for testing an aircraft brake disc according to an embodiment of the present invention.
Figure 2:
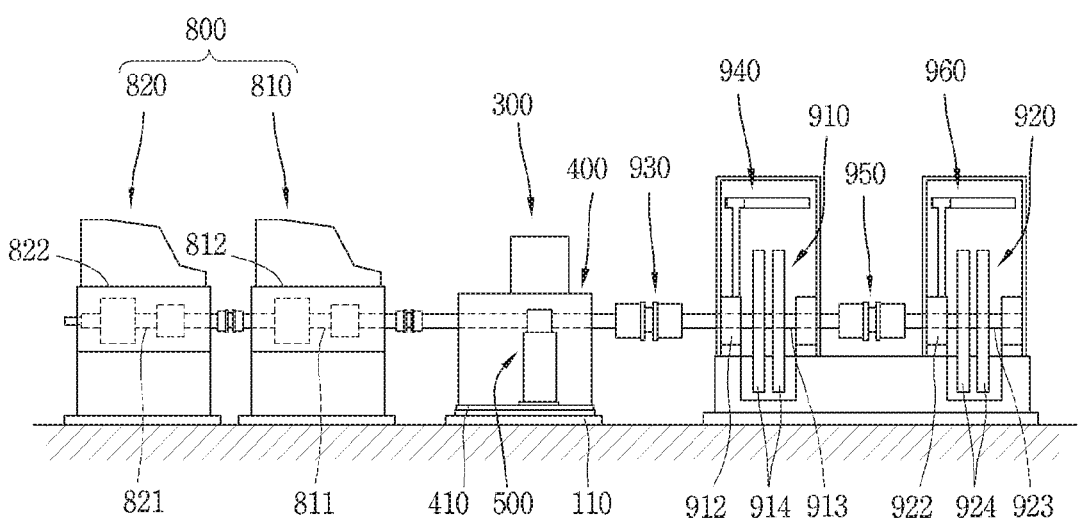
FIG. 2 is a front view illustrating the apparatus for testing an aircraft brake disc according to an embodiment of the present invention.

FIG. 1 is a plan view illustrating an apparatus for testing an aircraft brake disc according to an embodiment of the present invention. FIG. 2 is a front view illustrating the apparatus for testing an aircraft brake disc according to an embodiment of the present invention.

As illustrated in FIGS. 1 and 2, an apparatus for testing an aircraft brake disc according to an embodiment of the present invention includes a base member 100, a main shaft 200, a wheel assembly 300, a first wheel mount assembly 400, a first driving unit 500, a second wheel mount assembly 600, a second driving unit 700, a motor assembly 800, and a first flywheel assembly 910.

The base member 100 includes a base plate unit 110 and a shaft mount unit 120 at the center of the base plate unit 110. The shaft mount unit 120 is positioned at the center of the base plate unit 110. The shaft mount unit 120 includes two support frames 121 disposed at a predetermined distance from each other and bearing assemblies 122 on the support frames 121.

The main shaft 200 is rotatably mounted on the shaft mount unit 120 on the base member 100. The main shaft 200 is disposed through the bearing assemblies 122, with both ends rotatably supported by the bearing assemblies 122. The longitudinal direction of the main shaft 200 is perpendicular to the longitudinal direction of the base member 100.

The wheel assembly 300 is coupled to the main shaft 200. The wheel assembly 300 is fixed to the main shaft 200, between the support frames 121. The wheel assembly 300 includes a disc-shaped wheel having a uniform width. The radial direction of the wheel may be parallel with the longitudinal direction of the base member 100.

Figure 3:
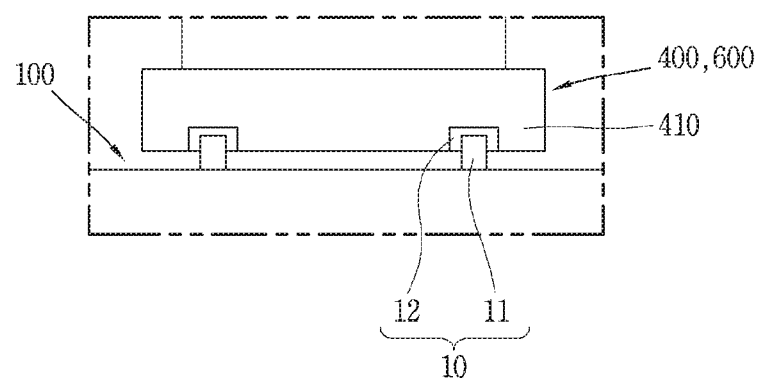
FIG. 3 is a front view illustrating a guide unit of the apparatus for testing an aircraft brake disc according to an embodiment of the present invention.

The first wheel mount assembly 400, where a wheel to be tested is separably mounted, is disposed at a side on the base member 100 to be capable of moving in the radial direction of the wheel assembly 300. The first wheel mount assembly 400 includes a base plate 410 facing the base member 100, a body 420 on the base plate 410, a wheel mount unit 430 that is disposed at a side of the body 420 and on which a wheel to be tested is separably mounted, and a pressing unit (not illustrated) pressing brake discs in a wheel mounted on the wheel mount unit 430 to be tested. The wheel mount unit 430 is positioned in parallel with the wheel center line of the wheel assembly 300. As illustrated in FIG. 3, a guide unit 10 may be disposed between the first wheel mount assembly 400 and the base member 100 so that the first wheel mount assembly 400 is guided straight by the guide unit 10. The guide unit 10 includes LM guides 11 disposed in parallel at a predetermined distance from each other on the base member 100 and sliding blocks 12 slidably combined with the LM guides 11, in which the sliding blocks 12 are coupled to the bottom of the base plate 410 of the first wheel mount assembly 400. Two LM guides 11 are positioned perpendicular to the wheel center line of the wheel assembly 300. The body 420, as illustrated in FIG. 1, is formed in an L-shape and has the wheel mount unit 430 protruding at a side. The wheel mount unit 430 is formed in the shape of a shaft such that a wheel is fitted on it, and its center line may be in the same plane along with the center line of the wheel assembly 300.

The first driving unit 500 moves the first wheel mount assembly 400. The first driving unit 500 is disposed at a side from the first wheel mount assembly 400, opposite the wheel assembly 300, and may be positioned on the same line along with the wheel assembly 300 and the first wheel mount assembly 400. The first driving unit 500 may include a hydraulic cylinder 510 and a rod of the hydraulic cylinder 510 is connected to the first wheel mount assembly 400. The first driving unit 500 pushes the first wheel mount assembly 400 toward the wheel assembly 300 or pulls it away from the wheel assembly 300.

The second wheel mount assembly 600, where a wheel to be tested is mounted, is disposed at the other side on the base member 100 to be capable of moving in the radial direction of the wheel assembly 300. The second wheel mount assembly 600 is disposed on the same line along with the wheel assembly 300 and the first wheel mount assembly 400, opposite the first wheel mount assembly 400 with the wheel assembly 300 therebetween. The second wheel mount assembly 600 includes a base plate 610 facing the base member 100, a body 620 on the base plate 610, a wheel mount unit 630 that is disposed at a side from the body 620 and on which a wheel to be tested is separably mounted, and a pressing unit (not illustrated) pressing brake discs in a wheel mounted on the wheel mount unit 630 to be tested. The wheel mount unit 630 is positioned in parallel with the wheel center line of the wheel assembly 300. As illustrated in FIG. 3, a guide unit 10 may be disposed between the second wheel mount assembly 600 and the base member 100 so that the second wheel mount assembly 600 is guided straight by the guide unit 10. The guide unit 10 includes LM guides 11 disposed in parallel at a predetermined distance from each other on the base member 100 and sliding blocks 12 slidably combined with the LM guides 11, in which the sliding blocks 12 are coupled to the bottom of the base plate 610 of the second wheel mount assembly 600. Two LM guides 11 are positioned perpendicular to the wheel center line of the wheel assembly 300. The body 620, as illustrated in FIG. 1, is formed in a reversed L-shape and has the wheel mount unit 630 protruding at a side. The wheel mount unit 630 is formed in the shape of a shaft such that a wheel is fitted on it, and its center line may be in the same plane along with the center line of the wheel assembly 300.

The second driving unit 700 moves the second wheel mount assembly 600. The second driving unit 700 is disposed at a side from the second wheel mount assembly 600, opposite the wheel assembly 300. The second driving unit 700 may include a hydraulic cylinder 710 and a rod of the hydraulic cylinder 710 is connected to the second wheel mount assembly 600. The second driving unit 700 pushes the second wheel mount assembly 600 toward the wheel assembly 300 or pulls it away from the wheel assembly 300.

The maximum force of the second driving unit 700 that presses the second wheel mount assembly 600 may be smaller than the maximum force of the first driving unit 500 that presses the first wheel mount assembly 400.

The motor assembly 800 is connected to a side of the main shaft 200 and rotates the wheel assembly 300. The motor assembly 800 may include a first motor 810 connected to the main shaft 200 and generating torque for the main shaft 200 and a second motor 820 connected to the first motor 810 and generating torque for the main shaft 200. The first motor 810 includes a motor shaft 811 connected to the main shaft 200, a rotor (not illustrated) fitted on the motor shaft 811, a stator (not illustrated) rotating the rotor in cooperation with the rotor, and a motor casing 812 housing the rotor and the stator. The second motor 820 includes a motor shaft 821 connected to the motor shaft 811 of the first motor 810, a rotor (not illustrated) fitted on the motor shaft 821, a stator (not illustrated) rotating the rotor in cooperation with the rotor, and a motor casing 822 housing the rotor and the stator. When the first and second motors 810 and 820 are activated to generate torque, the torque is transmitted to the main shaft 200 through the motor shafts 811 and 821 and rotates the main shaft 200 and the wheel assembly 300 is rotated by the rotation of the main shaft 200.

As another embodiment of the motor assembly 800, the motor assembly 800 includes a sub-shaft (not illustrated) connected to the main shaft 200, first and second motors (not illustrated), a first power transmission unit (not illustrated) transmitting the torque from the first motor to the sub-shaft, and a second power transmission unit (not illustrated) transmitting the torque from the second motor to the sub-shaft.

A static force assembly 130 may be disposed between the wheel assembly 300 and the motor assembly 800.

The first flywheel assembly 910 is separably coupled to the other side of the main shaft 200. The first flywheel assembly 910 is disposed opposite the motor assembly 800, with the wheel assembly 300 therebetween. The first flywheel assembly 910 includes support frames 911 disposed at a predetermined distance from each other, bearing assemblies 912 disposed on the support frames 911, a wheel shaft 913 connected to the main shaft 200 through the bearing assemblies 912, and flywheels 914 fitted on the wheel shaft 913, between the support frames 911. The wheel shaft 913 and the main shaft 200 may be connected to each other by a coupling unit 930. The first flywheel unit 910 and the main shaft 200 may be connected to or separated from a flywheel connector 940.

A second flywheel assembly 920 is disposed at a side from the first flywheel assembly 910 and is coupled to or separated from the first flywheel unit 910. The second flywheel assembly 920 is disposed opposite the motor assembly 800, with the wheel assembly 300 therebetween. The second flywheel assembly 920 includes support frames 921 disposed at a predetermined distance from each other, bearing assemblies 922 disposed on the support frames 921, a wheel shaft 923 connected to the wheel shaft 913 of the first flywheel assembly 910 through the bearing assemblies 922, and flywheels 914 fitted on the wheel shaft 923, between the support frames 921. The wheel shaft 913 of the first flywheel assembly 910 and the wheel shaft 923 of the second flywheel assembly 920 may be connected to each other by a coupling unit 950. The wheel shaft 923 of the second flywheel assembly 920 and the wheel shaft 913 of the first flywheel assembly 910 may be connected to or separated from each other by a flywheel connector 960. The center line of the second flywheel assembly 920 may be positioned on the same straight line along with the center line of the first flywheel assembly 910.

A first blowing unit 140 that dissipates heat is disposed at a side from the wheel assembly 300. The first blowing unit 140 dissipates heat that is generated when a wheel mounted on the first wheel mount assembly 400 to be tested comes in contact with a side of the wheel assembly 300. A second blowing unit 150 that dissipates heat is disposed at the other side from the wheel assembly 300. The second blowing unit 150 dissipates heat that is generated when a wheel mounted on the second wheel mount assembly 920 to be tested comes in contact with the other side of the wheel assembly 300.

The operation and effects of the apparatus for testing an aircraft brake disc according to the present invention are described hereafter.

First, a brake disc for large-sized wheels of large-sized aircrafts is to be tested, a wheel with a brake disc assembly to be tested is mounted on the wheel mount unit 430 of the first wheel mount assembly 400. The first flywheel assembly 910 and the main shaft 200 are connected to each other and the second flywheel assembly 920 is connected to the first flywheel assembly 910 so that the torque of the main shaft 200 is transmitted to the first flywheel assembly 910 and the second flywheel assembly 920. The wheel assembly 300 and the first and second flywheel assemblies 910 and 920 are rotated by operating the motor assembly 800. The motor assembly 800 rotates the wheel assembly 300 and the first and second flywheel assemblies 910 and 920 such that they have kinetic energy required for the test. When the wheel assembly 300 has a rotation speed required to the test, the motor assembly 800 is stopped. The wheel assembly 300 and the first and second flywheel assemblies 910 and 920 keep rotating with the kinetic energy. In this state, the first wheel mount assembly 400 mounted with the wheel to be tested is moved to the wheel assembly 300 by operating the first driving unit 500, so the wheel is pressed at a predetermined pressure in contact with the wheel assembly 300. A pressure disc is pressed to a rear disc by the pressing unit of the first wheel mount assembly 400. As the pressure disc is pressed to the rear disc, fixing discs and rotary discs are sequentially pressed, and the wheel assembly 300 and the wheel to be tested are stopped by friction force between the fixing discs and the rear discs. Through this process, the braking performance of a brake disc disposed in a wheel to be tested is tested. That is, not only the braking time and the braking distance are tested, but the friction and wear characteristics of the brake disc are tested. When a brake disc for middle-sized aircrafts is tested, the second flywheel assembly 920 is separated from the first flywheel assembly 910 and then a wheel to be tested is tested in the way described above.

Further, a brake disc for small-sized wheels of small-sized aircrafts is to be tested, a wheel with a brake disc to be tested is mounted on the wheel mount unit 630 of the second wheel mount assembly 600. The first flywheel assembly 910 and the main shaft 200 are separated so that the torque of the main shaft 200 is not transmitted to the first flywheel assembly 910. The wheel assembly 300 is rotated by operating the motor assembly 800. The motor assembly 800 rotates the wheel assembly 300 such that the wheel assembly 300 has kinetic energy required for the test. When the wheel assembly 300 has a rotation speed required to the test, the motor assembly 800 is stopped. The wheel assembly 300 keeps rotating with the kinetic energy. In this state, the second wheel mount assembly 600 mounted with the wheel to be tested is moved to the wheel assembly 300 by operating the second driving unit 700, so the wheel is pressed at a predetermined pressure in contact with the wheel assembly 300. A pressure disc is pressed to a rear disc by the pressing unit of the second wheel mount assembly 600. As the pressure disc is pressed to the rear disc, fixing discs and rotary discs are sequentially pressed, and the wheel assembly 300 and the wheel to be tested are stopped by friction force between the fixing discs and the rear discs. Through this process, the braking performance of a brake disc disposed in a wheel to be tested is tested. That is, not only the braking time and the braking distance are tested, but the friction and wear characteristics of the brake disc are tested.

As described above, according to the present invention, a wheel with a brake disc to be tested is mounted on a wheel mount assembly and is pressed by the wheel assembly 300 rotating with predetermined kinetic energy by pushing the wheel mount assembly with a driving unit. Further, the brake disc is tested by applying braking force to a brake disc assembly. Accordingly, an aircraft brake disc is tested under conditions similar to those when an aircraft equipped with the aircraft brake disc is landing. Accordingly, it is possible to accurately testing a brake disc assembly.

Further, according to the present invention, it is possible not only to test various types of aircraft brake discs such as brake discs for large-sized, middle-sized, and small-sized aircrafts, but to quickly and easily test various types of aircraft brake discs.

Further, according to the present invention, since the first and second blowing units 140 and 150 are disposed at both sides from the wheel assembly, the heat generated by the wheel to be tested and the wheel assembly 300 when the wheel is pressed to the wheel assembly 300 to be tested, such that it is possible to achieve conditions similar to those when an aircraft is landing with motions and it is also possible to prevent damage to a wheel to be tested during testing due to overheating.

While the present invention has been illustrated and described in connection with the exemplary embodiments, it will be apparent to those skilled in the art that modifications and variations can be made without departing from the spirit and scope of the invention as defined by the appended claims.

What is claimed is:

1. An apparatus for testing an aircraft brake disc, comprising:
    a base member having a shaft mount unit;
    a main shaft rotatably mounted on the shaft mount unit of the base member;
    a wheel assembly couple to the main shaft;
    a first wheel mount assembly that is disposed at a side from the base member to move in the radial direction of the wheel assembly and on which a wheel to be tested is separably mounted;
    a first driving unit moving the first wheel mount assembly;
    a second wheel mount assembly that is disposed at the other side from the base member to move in the radial direction of the wheel assembly and on which a wheel to be tested is mounted;
    a second driving unit moving the second wheel mount assembly;
    a motor assembly connected to a side of the main shaft and rotating the wheel assembly;
    a first flywheel assembly separably coupled to the other side of the main shaft; and
    a second flywheel assembly separably coupled to the first flywheel assembly,
    wherein the motor assembly includes
        a first motor connected to the main shaft and generating torque for the main shaft, and
        a second motor connected to the first motor and generating torque for the main shaft,
    wherein the first flywheel assembly comprising:
        support frames disposed at a predetermined distance from each other;
        bearing assemblies disposed on the support frames;
        a wheel shaft connected to the main shaft through the bearing assemblies;
        a flywheel fitted on the wheel shaft between the support frames; and
        a coupling unit connecting the wheel shaft and the main shaft,
    wherein the second flywheel assembly comprising:
        support frames disposed at a predetermined distance from each other;
        bearing assemblies disposed on the support frames;
        a wheel shaft connected to the wheel shaft of the first flywheel assembly through the bearing assemblies;
        a flywheel fitted on the wheel shaft between the support frames; and
        a coupling unit connecting the wheel shaft of the first flywheel assembly and the wheel shaft of the second flywheel assembly,
    wherein the main shaft, the wheel shaft of the first flywheel assembly, and the wheel shaft of the first flywheel assembly are disposed on the same straight line,
    wherein the first flywheel unit and the main shaft are connected to or separated from each other by a first flywheel connector, and
        the wheel shaft of the second flywheel assembly and the wheel shaft of the first flywheel assembly are connected to or separated from each other by a second flywheel connector,
    wherein in case of testing a small-sized wheel, the first flywheel unit and the main shaft are separated by the first flywheel connector,
        in case of testing a middle-sized wheel, the first flywheel unit and the main shaft are connected by the first flywheel connector, and the wheel shaft of the second flywheel assembly and the wheel shaft of the first flywheel assembly are separated by the second flywheel connector,
        in case of testing a large-sized wheel, the first flywheel unit and the main shaft are connected by the first flywheel connector, and the wheel shaft of the second flywheel assembly and the wheel shaft of the first flywheel assembly are connected by the second flywheel connector.

2. The apparatus of claim 1, further comprising:
    a first blowing unit dissipating heat that is generated when a wheel to be tested comes in contact with a side of the wheel assembly; and
    a second blowing unit dissipating heat that is generated when a wheel to be tested comes in contact with the other side of the wheel assembly.

3. The apparatus of claim 1, wherein the shaft mount unit includes two support frames disposed at a predetermined distance from each other on the base member, with the wheel assembly therebetween, and bearing assemblies disposed on the support frames and supporting the main shaft.

4. The apparatus of claim 1, wherein the first wheel mount assembly, the wheel assembly, and the second wheel mount assembly are disposed on the same straight line.

5. The apparatus of claim 1, wherein the maximum force of the first driving unit is larger than the maximum force of the second driving unit.

6. The apparatus of claim 1, wherein the first and second driving units each include a hydraulic cylinder.

7. The apparatus of claim 1, wherein the first wheel mount assembly includes a base plate facing the base member, a body disposed on the base plate, a wheel mount unit that is disposed at a side of the body and on which a wheel to be tested is mounted, and a pressing unit pressing a brake disc assembly of a wheel mounted on the wheel mount unit to be tested.

8. The apparatus of claim 7, wherein the center line of the wheel mount unit and the center line of the wheel assembly are disposed in the same plane.

9. The apparatus of claim 7, wherein the body is formed in an L-shape.

10. The apparatus of claim 1, wherein the second wheel mount assembly includes a base plate facing the base member, a body disposed on the base plate, a wheel mount unit that is disposed at a side of the body and on which a wheel to be tested is mounted, and a pressing unit pressing a brake disc assembly of a wheel mounted on the wheel mount unit to be tested.

11. The apparatus of claim 10, wherein the center line of the wheel mount unit of the second wheel mount assembly and the center line of the wheel assembly are disposed in the same plane.

12. The apparatus of claim 10, wherein the body is formed in a reversed L-shape.

* * * * *